Patented July 6, 1926.

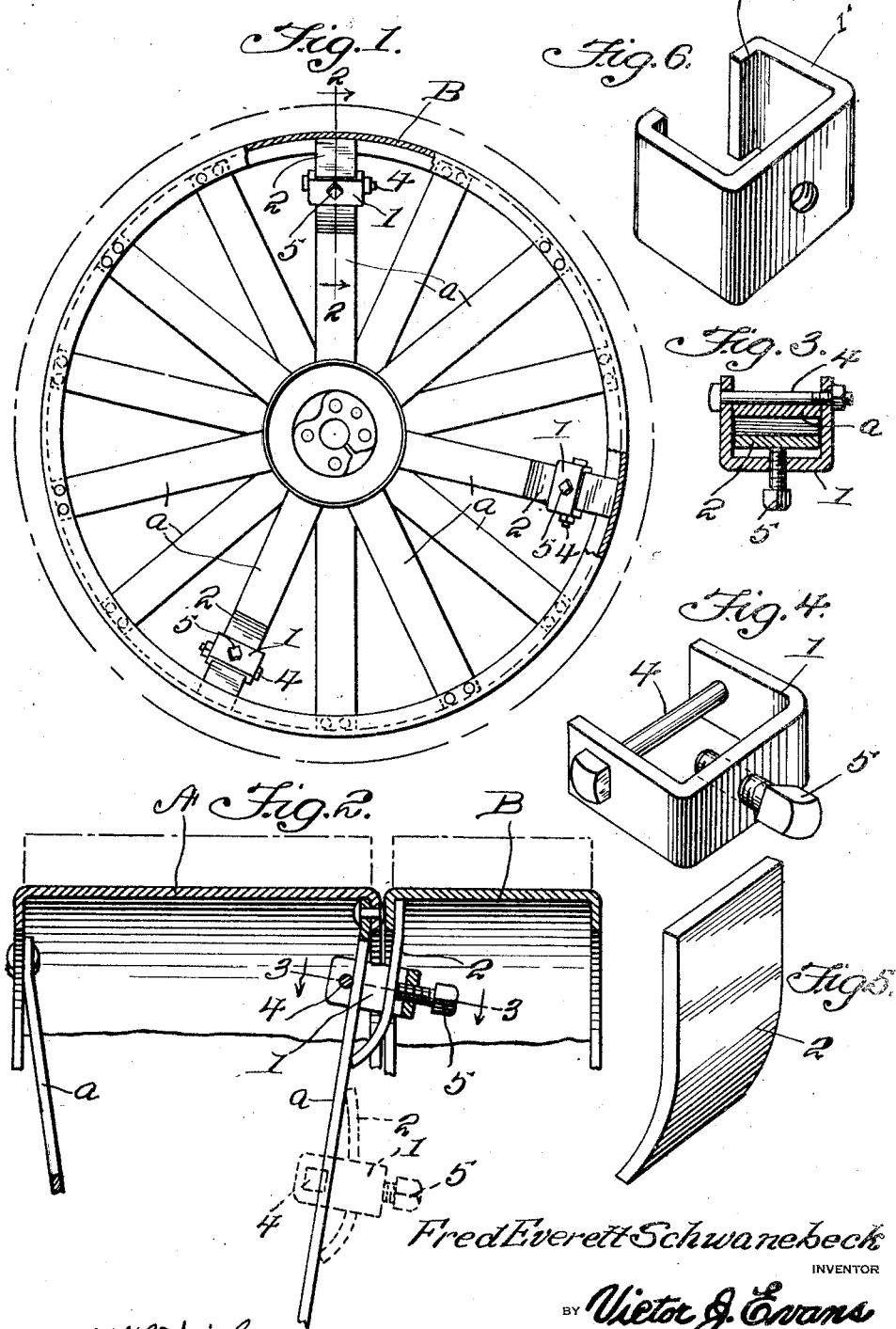

1,591,498

UNITED STATES PATENT OFFICE.

FRED EVERETT SCHWANEBECK, OF FENTON, MICHIGAN.

RIM CLAMP.

Application filed July 29, 1925. Serial No. 46,892.

This invention relates to a fastener for an extension rim of a tractor or the like, the general object of the invention being to provide a clamp device for engaging a spoke of a wheel and a spring member carried by the clamp and engaging the extension rim.

This invention also consists in certain other features of construction and in the combination and arrangement of the several parts, to be hereinafter fully described, illustrated by the accompanying drawings and specifically pointed out in the appended claims.

In describing my invention in detail, reference will be had to the accompanying drawings wherein like characters denote like or corresponding parts throughout the several views, and in which:—

Figure 1 is an elevation of a tractor wheel, showing the invention in use.

Figure 2 is a section on line 2—2 of Figure 1.

Figure 3 is a section on line 3—3 of Figure 2.

Figure 4 is a perspective view of the clamp.

Figure 5 is a view of the plate.

Figure 6 is a view of a modified form of clamp.

In these views, A indicates the rim of the wheel, the spokes of which are shown at $a$ and B indicates the extension rim. The extension rim is detachably connected with the wheel by means of the clamps 1 and the curved plates 2, the clamps engaging certain of the spokes $a$ and holding the plates 2 in engagement with the extension rim and thus supporting the extension rim in place. Each clamp is of channel shape, so that it can embrace a spoke and is held on the spoke by the bolt 4 which passes in rear of the spoke. A set screw 5 is carried by the bight of the clamp and is adapted to engage a central part of the plate 2 so as to hold the plate with one end pressed against a spoke and the other end pressed against the inner flange of the extension rim B. Thus the extension rim will be firmly held in place by the device and when it is to be removed, it is simply necessary to loosen the screw 5 and permit the parts to slide down the spoke, as shown in dotted lines in Figure 2, after which the screw is tightened to press the plate 2 against the spoke. Thus it is not necessary to remove the devices from the wheel after they have once been put in place. This invention can be manufactured to sell at low cost and it will effectively hold an extension rim in place and it will permit the rim to be easily and quickly put in position and removed from the wheel.

Figure 6 shows a slightly different form of clamp. In this form, the clamp 1' has inwardly extending parts 1" at its extremities for engaging a spoke so that the bolt 4 is eliminated in this form.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A fastener for an extension rim of a wheel, comprising a clamp adapted to be placed on a spoke of the wheel, a plate for engaging the spoke and a part of the extension rim and a set screw carried by the clamp engaging the plate.

2. A device for holding an extension rim to a wheel, comprising a channel shaped clamp for engaging a spoke of the wheel, a bolt carried by the limbs of the clamp passing in rear of the spoke, a curved plate passing through the clamp and engaging the spoke and the extension rim and a set screw carried by the clamp and engaging the plate.

In testimony whereof I affix my signature.

FRED EVERETT SCHWANEBECK.